United States Patent [19]

Lynch

[11] Patent Number: 5,388,183

[45] Date of Patent: Feb. 7, 1995

[54] SPEECH RECOGNITION PROVIDING MULTIPLE OUTPUTS

[75] Inventor: Thomas E. Lynch, Brighton, Mass.

[73] Assignee: Kurzweil Applied Intelligence, Inc., Waltham, Mass.

[21] Appl. No.: 767,437

[22] Filed: Sep. 30, 1991

[51] Int. Cl.⁶ .......................... G10C 7/08; G10L 7/08
[52] U.S. Cl. .................... 395/2.51; 395/245; 395/275; 395/267; 381/41
[58] Field of Search ..................... 381/36–53; 392/9; 395/2, 2.1–2.87

[56] References Cited

U.S. PATENT DOCUMENTS

| | | | |
|---|---|---|---|
| 4,481,593 | 11/1984 | Bohler | 381/43 |
| 4,624,011 | 11/1986 | Watanabe et al. | 381/43 |
| 4,718,088 | 1/1988 | Balor et al. | 395/2 |
| 4,718,092 | 1/1988 | Klostad | 381/43 |
| 4,718,093 | 1/1988 | Brown | 381/43 |
| 4,977,599 | 12/1990 | Bohl et al. | 395/2 |
| 4,980,918 | 12/1990 | Bohl et al. | 381/43 |
| 5,023,911 | 6/1991 | Gerson | 381/45 |
| 5,027,406 | 6/1991 | Roberts et al. | 381/43 |
| 5,031,217 | 7/1991 | Nishimura | 381/43 |
| 5,040,213 | 8/1991 | Yasuda et al. | 381/43 |
| 5,040,215 | 8/1991 | Amano et al. | 381/43 |
| 5,072,452 | 12/1991 | Brown et al. | 381/43 |
| 5,073,921 | 12/1991 | Nomura et al. | 381/43 |
| 5,086,472 | 2/1992 | Yoshida | 381/43 |
| 5,121,465 | 6/1992 | Sakue | 395/2 |
| 5,129,001 | 7/1992 | Bohl et al. | 381/43 |
| 5,129,002 | 7/1992 | Tsuboka | 381/43 |

FOREIGN PATENT DOCUMENTS

| | | |
|---|---|---|
| 0312209 | 4/1989 | European Pat. Off. |
| 0321410 | 6/1989 | European Pat. Off. |
| 0387602 | 9/1990 | European Pat. Off. |

OTHER PUBLICATIONS

European Search Report in corresponding European Patent Application issued by European Patent Office on Oct. 22, 1993.

Primary Examiner—Allen R. MacDonald
Assistant Examiner—Tariq Hafiz
Attorney, Agent, or Firm—Henry D. Pahl, Jr.

[57] ABSTRACT

In the speech recognition system disclosed herein, the Viterbi decoding of an acoustic recognition network is augmented by implementing additional data structures for each arc in the network which represent, for each arc, the best path cost of reaching the last point on that arc and an arc in time which represents, for the best path, the time of leaving the previous arc. These additional data structures enable a trace back procedure which identifies not only the presumably optimal path but also alternate paths having good scores.

5 Claims, 10 Drawing Sheets

Microfiche Appendix Included
(39 Microfiche, 1 Pages)

SPEECH RECOGNITION PROVIDING MULTIPLE OUTPUTS

MICROFICHE APPENDIX

The disclosure in this case includes a computer program listing microfiche appendix comprising one microfiche providing a total of 39 frames.

BACKGROUND OF THE INVENTION

The present invention relates to speech recognition systems and more particularly to an improvement of Viterbi decoding using a recognition network to enable the identification of alternate paths through the network.

It is relatively conventional to implement speech recognition by applying Viterbi decoding to an acoustic recognition network which is made up of interconnected arcs which model respective preselected speech segments, e.g. phonemes or similar speech sub-units. At each of the intersections between arcs, commonly referred to as "nodes", data structures are implemented which preserve the identity of the best path reaching that node up to the present time.

Speech to be recognized is digitally converted to a succession of frames which characterize the speech at respective instances in time, e.g. by comprising a multi-dimensional vector characterizing the spectral content of the acoustic signal at that point in time. Successive frames are matched to each possible arc and a cost metric is evaluated which corresponds to the likelihood of match. When the end of the network, e.g. a silence, is reached, a trace back procedure identifies the path through the network which produced the best score.

The Viterbi decoding technique uses the fact that any sub-path of the optimal path through the network is itself optimal. This makes Viterbi decoding highly efficient but destroys a lot of possibly useful information about alternative recognition hypotheses. In practical speech recognition systems, however, particularly those attempting to recognize continuous speech, it is highly desirable to identify not only the best match of an unknown input pattern to a set of preselected speech patterns but also to provide good alternate hypotheses which may represent good solutions. The providing of multiple recognition hypotheses allows semantic and syntactic information to be applied at a later stage and allows the user to more easily correct misrecognitions. If the acoustic recognizer system provides for such alternate hypotheses, the application of contextual information may allow a much improved overall recognition procedure by allowing information regarding the surrounding words to enable a much improved choice from amongst the alternatives.

Among the several objects of the present invention may be noted the provision of an improved speech recognition system; the provision of such a speech recognition system which employs an acoustic recognition network and which identifies multiple possible paths through the network in response to input speech to be recognized; the provision of such a system in which the output is itself a limited network definition; the provision of such a system which facilitates the utilization of contextual information; the provision of such a system which does not require the evaluation of all possible paths through the network; the provision of such a system which is computationally efficient; the provision of such a system which is highly accurate; and the provision of such a system which is highly reliable and is of relatively simple and inexpensive implementation. Other objects and features are in part apparent and in part pointed out hereinafter.

SUMMARY OF THE INVENTION

The present invention relates to a speech recognition system of the type in which a path is dynamically decoded through a recognition network of sound characterizing arcs, predetermined ones of which connect at nodes defining permissible transitions. The decoding is performed by matching sequential input acoustic segments to corresponding points along each possible arc and by measuring closeness of match to obtain a cost metric for reaching each node by the best path for each input time. In accordance with the present invention, an output structure is generated by calculating and storing, along with the node cost metrics, an arc score which represents the best path cost of reaching the last point on that arc at the corresponding time and an arc intime which represents, for the best path, the time of leaving the previous arc. When the end of the recognition network is reached, a trace back procedure is initiated in which a minimal node out score is assigned to the end of the recognition network and, for each successive node encountered in the trace back, incoming arcs are selected which have arc scores which, when combined with the node out score of the respective terminating node, do not exceed the best path score for the end of the recognition network by more than a preselected margin. For each node which initiates a selected arc, a node out score is calculated which represents the cost of the best path from that node to the end of the recognition network. Accordingly, the successively selected arcs and the joining nodes define an output structure. The resulting output network structure consists of those arc hypotheses resulting from local Viterbi decodings such that, for each such arc hypothesis, there is a decoding path containing it, which has a score which is within a preselected offset of the score of the best scoring path through the network.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
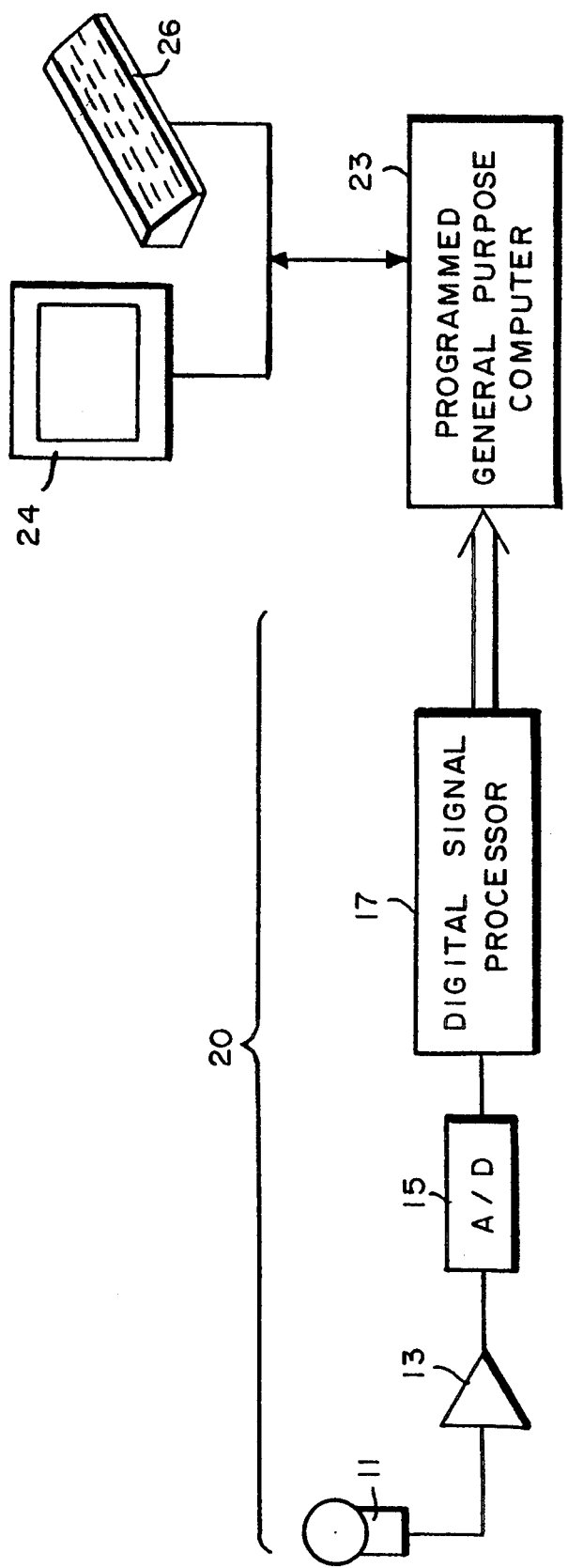
FIG. 1 is a diagrammatic illustration of special and general purpose computer hardware of the type which is useful in the practice of the present invention.

In common with many prior art systems, the apparatus of the present invention operates by first transducing acoustic speech waveform to obtain corresponding electrical signals and then digitizes those signals. With reference to FIG. 1, the transducer there indicated is a microphone 11 which is connected, through a suitable preamplifier 13, to an analog-to-digital converter 15. As is also usual in the art, the speech signal is treated to obtain, at a succession of sample times, a sequence of digital values which characterize the speech. In the embodiment illustrated, these values are obtained by passing the speech signal through a digital signal processor 17 which performs a Fourier transform so as to extract spectral features characterizing the input speech. The collection of digital values defining the input spectrum at a given moment of time is referred to hereinafter as a frame. Each frame may be considered to be a multidimensional vector as understood by those skilled in the art. Further, each frame may, in some instances, be represented by an encoded index or symbol to reduce the amount of data which must be stored and manipulated in the subsequent processes performed by the method of the present invention.

Collectively, the front end circuitry is identified by reference character 20. Though the input signal processing is illustrated as being implemented digitally, it should be understood that analog filtering followed by analog-to-digital conversion might also be used. Likewise, while multichannel filtering is presently preferred, it should be understood that other methods of treating or encoding the raw input signal might also be employed, for example, linear predictive encoding which might also be done by special purpose hardware.

A general purpose microcomputer system 23, e.g. one employing an Intel 80386 microprocessor, is provided for general system management and control functions, as well as for processing of the distance or scoring calculations and the implementation of the algorithms of the present invention. As is conventional, computer 23 incorporates a video display 24 and a keyboard 26 for providing interaction with the system user.

As indicated previously, the improvement of the present invention is based upon a basic system in which a sequence of input utterance frames is applied to an acoustic recognition network made up of interconnected arcs which model a preselected set of acoustic patterns. The particular network utilized in the illustrated embodiment of the present invention is based on the Japanese language. While typical Japanese speech encompasses a very large vocabulary of words or phrases, the phrases themselves are made up of a fairly limited set of so-called mora which are somewhat constrained in context so that the generation of an acoustic recognition network is somewhat facilitated. Further, each mora can be modeled as an initial demi-mora and a final demi-mora with the boundary being chosen to represent the place where following contexts can begin to affect the vowel portion of the mora.

The Elements Of The Acoustic Recognition Network

In the particular acoustic recognition network employed in the embodiment illustrated, the individual arcs of the network correspond essentially to demi-mora. As certain examples used hereinafter in explaining the generation of output structures and the decoding of the recognition network utilize particular examples from the Japanese language, the following explanation of the modeling employed in the acoustic recognition network is useful.

Japanese has 12 consonants, {b, d, g, p, t, k, r, m, n, s, z, h}, two semi-vowels, {w, y}, and five vowels, {a, i, u, e, o}. Japanese phrases are composed of mori which are in turn composed of the above phonemes in the following patterns:
vowel
consonant-vowel
consonant- /y/ -vowel.

There are three additional Japanese mori: N is a syllabic nasal, Q lengthens the stop gaps of {p, t, k} or lengthens the frication of {s}, and there is a mora which lengthens the duration of the previous vowel. There is an essential lack of "syllable-final" consonants and there are no consonant clusters.

Japanese is considered to be a rhythmic language, that is, according to the textbooks, each mora is "perceived" as having the same duration as any other mora in the phrase. This isn't exactly true, but Japanese does not have the tense/lax or reduced vowel systems that make English vowel recognition difficult.

Japanese has a high degree of local coarticulation (or contextual allophonic variation) but the irreducible nature of the vowels tends to cut down wider coarticulation. Some examples of coarticulation are:
 ti is pronounced "chee": /t/ before /i/ or /y/ becomes /t/
 a-i is pronounced "aye": vowel sequences frequently become dipthongs
  (but glottal stop insertion is possible)
 a-ri can be pronounced as an aleolar tap during the /aI/dipthong or the /r/ can be realized as a stop as strong as the Japanese /t/
 a-N-i can be pronounced as an extended /aI/ dipthong in which the transition is nasalized
 N-mi can be pronounced such that N-m becomes a very long nasal murmur.

The last major aspect of Japanese acoustics is the possible devoicing of /i/, /u/, and sometime /yu/ when these occur between two voiceless consonants {p, t, k, s, h}.

When foreign words are introduced into Japanese, they sometime introduce non-Japanese sounds. The corresponding "foreign mori" considered in one implementation of the present invention are {Ti, Tu, Di, Du, Dyu, wi, we, wo, vi, ve, vo, fa, fi, fe, fo, and, fyu}.

In the acoustic recognition network, each Japanese phrase is modeled as a sequence of allophonic variations of mori with silence models at either end of the phrase. The allophonic variations depend on surrounding context such as the dipthongal nature of /a/ in the mora sequence a-i and include random alternatives such as possible vowel devoicing or the realization of /g/ as a voiced stop or as a velar nasal.

The models used in the acoustic recognition network are purely spectral. In this scheme, ba and ba-a (without a glottal stop) are modeled by the same sequence of spectral states since they differ mostly in duration. Similarly, ti and Q-ti share the same spectral model as do nu and N-nu. Following the operation of the present algorithm, duration information may be used or applied to discriminate between these sounds.

Each mora (or allophonic variation) is modeled as an "initial demi-mora" and a "final demi-mora" where the boundary is chosen, whenever possible, to represent the place where following context begins to affect the vowel portion of the mora. Those mori with potential "long" consonants (i.e., those starting with {p, t, k, or s} which could be preceded by Q and those starting with {m, n, or g} which could be preceded by N) have a "consonantal demi-mora" broken from their initial demi-mora. The consonantal demi-mori model, respectively, stop gaps, /s/ frication, or nasal murmur.

The list of demi-mori includes: (# indicates a phrase boundary)

initial demi-mori for all mori {a, bi, pa, su, N, etc.},
final demi-mori consisting of a vowel plus a following context:
{at, eu, oN, i#},
consonantal demi-mori: {mm, nn, gg, pp, tt, kk, ss}, and
silence/noise conditioned by context: {#a, #z, a##, N##}.

Thus, a Japanese phrase "atukau", would be broken down as a mora sequence as
a-tu-ka-u and as demi-mori as
a-a-at-tt-tu-uk-kk-ka-au-u-u#-u##.

Note that each demi-mora may represent one or more models depending on which models are appropriate for the context. Thus, since the /u/ in /tuk/ may be devoiced, the system will have both voiced and devoiced models of /tu/ and /uk/. Also, note that voiced models are not connected to unvoiced models. Looking at the /u/ demi-mora near the end of the phrase, note that not all /a/ models are appropriate here, only those which model "/u/ when preceded by an /a/".

There are also acoustic events which have an unusual number of demi-mora models:

The following depend on both left- and right-hand vocalic contexts:
{N, r, h, g, z}
The following become stop-like when phrase-initial or preceded by N:
{r, z}
/g/ can be produced as a velar voiced stop or nasal N
preceding consonants can become a bilabial, alveolar, or velar nasal
/i/, /u/, and sometimes /yu/ can become devoiced when surrounded by a voiceless context. Many of these contexts need to be modeled seperately: the /ik/ in devoiced /kik/ is quite different from the /ik/ in /sik/.

The Organization Of The Acoustic Recognition Network

Figure 2:
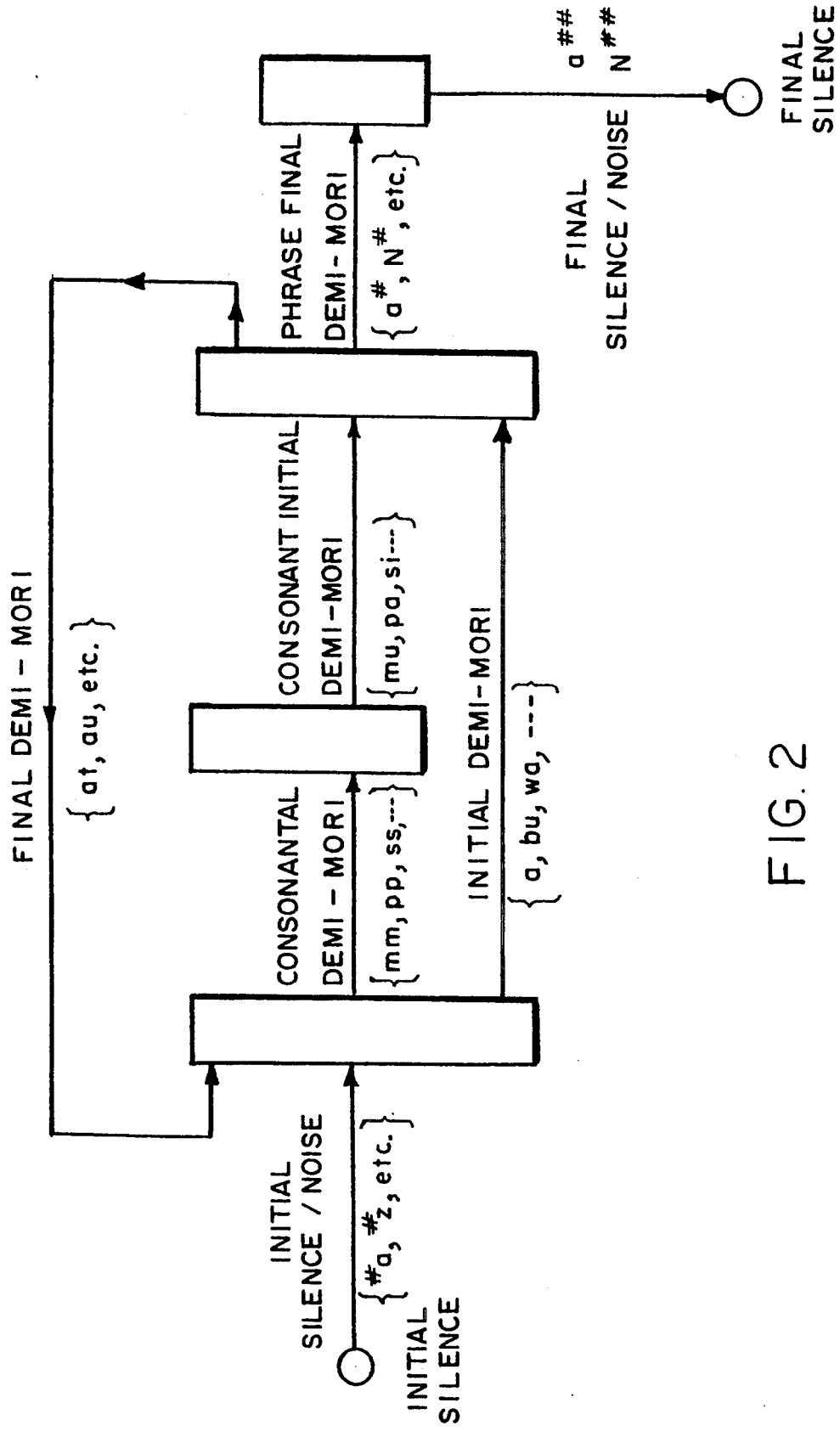
FIG. 2 illustrates an acoustic recognition network architecture employed in the practice of the present invention.

The demi-mora models are arranged in a network shown in FIG. 2. Note that the large blocks or nodes in the figure are actually composed of many smaller nodes and that only models with common boundaries can be connected. Some idea of this may be obtained from FIG. 3 which shows the demi-mori appropriate for "atukau" and can be considered to be a more detailed subset of the network of FIG. 2.

Figure 3:
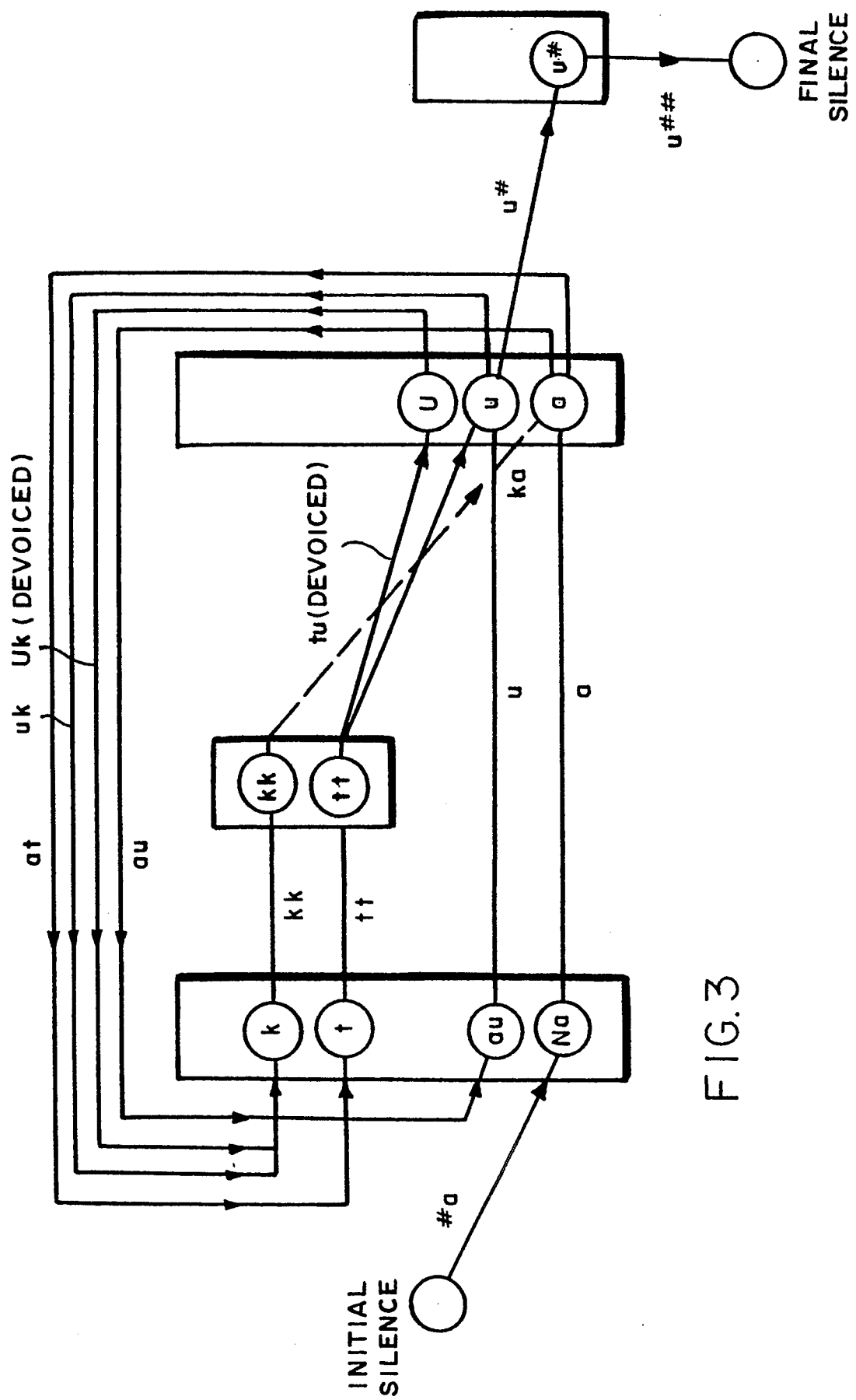
FIG. 3 illustrates a portion of the network of FIG. 2 in greater detail.
Figure 4:
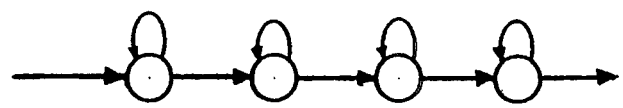
FIG. 4 is a diagram illustrating a form of arc employed in the recognition network of FIGS. 2 and 3.

While FIGS. 2 and 3 represent rather generally the correspondence of arcs with demi-mora and the nature of permitted interconnections of arcs, it should be understood that the individual arcs or demi-mora are represented as sequences of spectral models against which successive input frames are compared. The individual spectral models are referred to herein as kernels. The architecture of a 4-kernel arc is shown in FIG. 4. The circles represent kernels (spectral models) and the arrows represent allowed transitions between kernels. Note that transitions are allowed from a kernel to itself, i.e. a self-loop, as well as to the next kernel.

Figure 5:
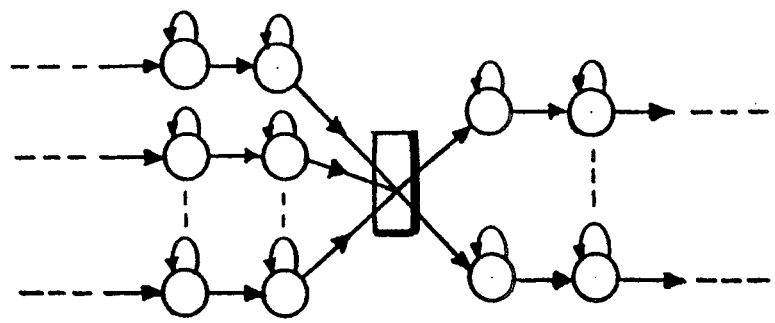
FIG. 5 is a diagram illustrating the arrangement of the network architecture near a node linking arcs.

The network architecture around a node is shown in FIG. 5. Transitions from incoming arcs on the left to outgoing arcs on the right pass through a node, represented by the box or rectangle in the middle. Any incoming kernel connects to all outgoing kernels. The node is essentially just a way of representing allowable transitions from the last kernels of incoming arcs to the first kernels of the outgoing arcs. It should also be understood that nodes themselves have no acoustic content.

Allocation Of Input Frames To Arcs

In accordance with conventional Viterbi decoding, the first frame is assigned to an initial kernel in the network (representing initial silence) and the assignments of successive input frames follow allowable transitions. An illustration of an allowable assignment path may be found in FIG. 6. Note that the first input frame must be assigned to the first kernel on some arc coming out of the initial silence node. Also note that, except around nodes, successive input frames can be assigned to the same kernel as the previous frame or to the next kernel. Around nodes, successive input frames can be assigned to the same kernel as the previous frame or to the first kernel of some outgoing arc connected through the node. A sequence of assignments is called a "path" through the reference network. A cost function is provided which measures the "closeness" or "acceptability" of input frames relative to the kernels (acoustic models).

The particular Viterbi decoder employed in one embodiment of the present invention employed the following data structures, certain of which were utilized in practicing the improvement of the present invention.

Score Structures:

KernelScore(T,A,K) is the cost of the best path to the Kth kernel on arc A for input frame T (In practice, KernelScore is preferably a 1-dimensional array indexed by a list of kernels in the network.)

NodeScore(T,N) is the cost of the best path to node N for input frame T (In practice, NodeScore is two 1-dimensional arrays indexed by the nodes and corresponding to In/Out.)

Figure 6:
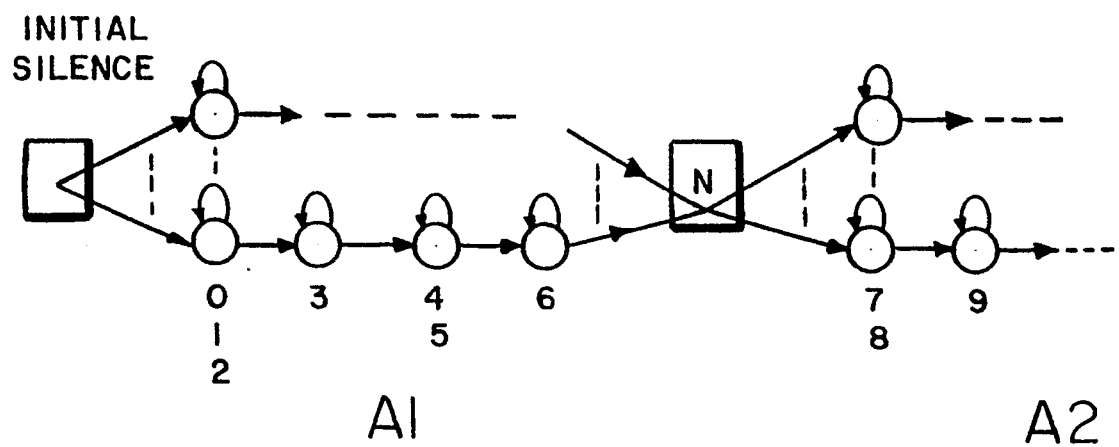
FIG. 6 is a diagram illustrating the application of frames representing input speech to successive arcs in the network.

ArcScore(T,A) is the cost of the best path to the last kernel on arc A for input frame T Timing Structures:

KernelInTime(T,A,K). Consider the best path that reaches the Kth kernel on arc A for input frame T. Before this best path entered arc A, it must have either left a previous arc or started from initial silence. KernelInTime(T,A,K) is either the (index of) the last input frame assigned to the previous arc or a default of −1 for initial silence. Referring to FIG. 6 KernelInTime(9,A,2)=6, the last frame assigned to the previous arc (assuming this is a best path). (As for KernelScore, KernelInTime is preferably realized as a 1-dimensional array indexed by a list of kernels.)

ArcInTime(T,A) is the same as KernelInTime(T,A,K) for the last kernel on each arc.

In more standard implementations of Viterbi decoding, there are no ArcScore or ArcInTime structures. Instead there are two traceback structures NodeIn- Time(T,N) and NodeInArc(T,N) in which the latter stores the (index of) the best arc leading into a node. In accordance with the practice of the present invention, ArcInTime and ArcScore are utilized to provide multiple candidates, not just the best one provided by Viterbi.

KernelScore can be defined as follows. Let F:t $\rightarrow k_F(t)$ t=0, 1, . . . , T
be a legal path through the recognition network so that $k_F(t)$ is the kernel assigned to input frame t by the assignment function, F. That is, input frame 0 is assigned to an initial silence kernel and the kernels are connected in the network: $k_F(t+1)$ is connected to $k_F(t)$ for t<T. We are assuming a distance function, Dist(t,k) which compares input frames, t, with kernels (acoustic models), k. For a path (assignment function), F, we can define a score:

$$PathScore(F) = \sum_{t=\phi}^{T} Dist(t, k_F(t))$$

as the accumulation of the frame distances along the assignment path. In the path depicted in FIG. 6, we would have PathScore(F) =

Dist(0,(A1,1)) + Dist(1,(A1,1)) + Dist(2,(A1,1)) +
Dist(3,(A1,2)) + Dist(4,(A1,3)) + Dist(5,(A1,3)) +
Dist(6,(A1,4)) + Dist(7,(A2,1)) + Dist(8,(A2,1)) +

Dist(9,(A2,2))

where A1 is the first arc on the path, A2 is the second, and (A,k) represents the kth kernel on arc A.

KernelScore(T,A,K) is the score of the best path ending at the Kth kernel of arc A at time T:
KernelScore(T,A,K)=MIN {PathScore(F)|$k_F(T)$ is the Kth kernel on A}.

Using the summation formulation, this can be rewritten as:

KernelScore(T,A,K) =

$$MIN\left\{ \sum_{t=\phi}^{\phi,T} Dist(t,k_F(t)) | k_F(T) = (A,K) \right\} \text{ legal paths } F =$$

$$MIN\left\{ \sum_{}^{\phi,T-1} Dist(t,k(t)) + Dist(T,(A,K)) \middle| \text{legal paths } F \right.$$

k(T − 1) is connected with (A,K)} =

$$MIN\left\{ \sum_{}^{\phi,T-1} Dist(t,k(t)) \middle| \text{legal paths } F \right.$$

k(T − 1) is connected with (A,K)} + Dist(T,(A,K)) =

MIN{KernelScore(T − 1,A',K')|(A',K')

(A',K') is connected with (A,K)} + Dist(T,(A,K)).

This is essentially the Viterbi algorithm: the score of the best legal path which assigns input frame T to kernel (A,K) is the minimum cost of reaching a kernel which connects to (A,K) at the previous input frame plus the cost of assigning input frame T to kernel (A,K). In other words, it's the cost of getting one step away from the kernel plus the cost of being there.

The ArcScore and NodeScore data structures are defined in the following manner.
ArcScore(T,A)=KernelScore(T,A,K) where K is the last kernel on A.

$$NodeScore(T,N) = \underset{A}{MIN}\{ArcScore(T,A)|A \text{ leads into } N\}.$$

Thus, ArcScore is just the score of the best path to the last kernel on an arc at a particular time and NodeScore is the score of the best path leading into a node at a particular time.

Given the local network architecture shown in FIGS. 2 and 3, we have the following:

KernelScore(T,A,K) = if (K! = 1) (i.e., not first kernel on arc)
MIN{Kernel Score(T − 1,A,K − 1), KernelScore(T − 1,A,K)} +

Dist(T,(A,K))

else (i.e., first kernel on arc)

MIN{NodeScore(T − 1,N), KernelScore(T − 1,A,K)} +

Dist(T,(A,K))

That is, since a non-initial kernel is only connected to itself and the preceding kernel, the only paths which reach such a kernel must have assigned the previous input frame either to that kernel or to the preceding one. For initial kernels on arcs, the previous input frame's kernel assignment could have been to the initial kernel itself or to any of the arc final kernels on the arcs leading into the incoming node. Since the node score contains the best of these incoming kernel scores, the computation is straightforward.

The Viterbi decoder is initialized by setting:
KernelScore(−1,A,K)=INFINITY for all A, K and
NodeScore(−1,N)=INFINITY if N is not the initial silence node O;
if N is the initial silence node so that it is impossible to be in any state except (pre-) initial silence if no input has yet been received. The InTime arrays don't need to be initialized.

InTime Values are calculated in the following manner.
KernelInTime is computed when KernelScore is computed:
For non-initial kernels on arcs: (K!=1)
if (KernelScore(T−1,A,K−1)<KernelScore(T−−1,A,K)) (if the path from the previous kernel is better than the self-loop path, the old previous kernel score is used and its intime is saved in KernelInTime)
KernelScore (T,A,K)=KernelScore(T−1,A,K−1)-+Dist(T, (A,K))
KernelInTime (T,A,K)=KernelInTime (T−1,A,K−1)
else (the best path to kernel is a self-loop: the old same kernel score is used and the intime is the same as before)
KernelScore(T,A,K)=KernelScore(T−1,A,K)-+Dist(T,(A,K)) KernelInTime (T,A,K)=KernelInTime(T−1,A,K).

With reference to FIG. 6 and again assuming that this is a best path, then there was a transition from arc A2, kernel 1 to kernel 2 for input frame 9 so that the first condition holds and KernelInTime(9,A2,2)=KernelInTime(8,A2,1) (=6).

Looking at input frame 5 where a self-loop occured, we have

KernelInTime(5,A1,3)=KernelInTime(4,A1,3) (=−1).

For initial kernels on arcs: (K==1)
if (NodeScore(T−1,N)<KernelScore(T−1,A,1)) (if the best path came from the preceding node, then the best path left the previous arc at T−1)
  KernelScore(T,A,1)=NodeScore(T−1,N)+Dist(T,(A,1))
  KernelInTime (T,A,1)=T−1
else (self-loop is best path: copy intime as above)
  KernelScore(T,A,1)=KernelScore(T−1,A,1)-+Dist(T,(A,1)) KernelInTime(T,A,1)=KernelInTime(T−1,A,1).

Further examples from FIG. 6 include:
KernelInTime(0,A1,1)=0−1 (transition from initial silence)
KernelInTime (1,A1,1)=KernelInTime(0,A1,1)=−1 (self-loop)
KernelInTime(7,A2,1)=7−1=6 (transition from previous node)
KernelInTime(8,A2,1)=KernelInTime(7,A2,1)=6 (self-loop).

ArcInTime(T,A) is just KernelInTime (T,A,K) for the last kernel on the arc.

When all of the frames of the input have been exhausted, the score of the last node (final silence) is the score of the best path through the network. In a standard Viterbi decoder, a simple traceback algorithm would be used to find the sequence of arcs taken by the best path through the network and this would be the most likely arc sequence recognized. However, in the system of the present invention, we wish to consider a large number of alternative arc sequences, not just the best scoring one. It may be noted that ArcScore and ArcInTime were computed during the dynamic programming but were never used. These are the data structures that will be used in generating the acoustic output network (AON).

Trace Back Procedure

After Viterbi decoding, there are the following data structures:

ArcScore(T,A) is the score of the best path through the recognition network which explains the first T+1 frames of the input and finishes on (the last kernel of) arc A.

ArcInTime(T,A). Along the above best path, this is the last input frame assigned to the previous arc (or −1 if this is the first arc).

NodeScore(T,N) is the score of the best path through the recognition network which explains the first T+1 frames of the input and finishes on node N.

NodeScore is not strictly necessary in the following procedure, but it is convenient and it saves having to redo some computations.

As indicated from the outset, one of the objects of the present invention is to identify alternate good paths through the acoustic recognition network and not just the best scoring path as is identified by conventional Viterbi decoding. In accordance with the present invention, a trace back procedure is implemented which identified not only the best path through the network but also alternate paths which correspond to good or possibly acceptable scores. This trace back is implemented by identifying, at each stage, various arc hypotheses and node hypotheses. An arc hypothesis may be considered to be the postulation of using an arc to explain a segment of the input speech. Since the full set of arc hypotheses is huge (number input frames × number input frames × number arcs), it is clearly impractical to compute or evaluate the full set. Rather, the method of the present invention examines an interesting or likely set of arc hypothesis selected by the use of the ArcScore and ArcInTime data structures identified previously.

We define an "arc hypothesis" as an arc, A, in the recognition network, an intime, T' and an outtime, T, in the input utterance, and a score which is the Viterbi best path score which explains the input utterance from frames T'+1 to T. That is, if we hypothesize "How well does A explain the input from T'+1 to T?", then the above score is an appropriate measure.

We wish to be able to connect these arc hypotheses. Since network arcs only connect at specified nodes, let N' be the innode for A and let N be the outnode. Then we have the following formal data structure for an arc hypothesis:

| Label | (A) |
| --- | --- |
| InNode | (T',N') |
| OutNode | (T,N) |
| Score | (Viterbi score for A explaining (T'+1,T)) |

For consistency, we will call pairs (T,N) node hypotheses.

Two arcs in the arc hypothesis network connect if the innode of one is the outnode of another. That is, they share a common node for the same input frame.

Note that a path through the recognition network explaining the entire input corresponds to an path through the arc hypothesis network starting at (first frame, initial silence) and finishing at (last frame, final silence). The primary difference between the paths in the two networks is that paths in the recognition network correspond to paths through kernels (spectral models) whereas in the arc hypothesis network the local paths through the kernels are assumed to be optimal so that the paths only involve arcs which are used to "explain" specified input segments which are roughly phonetic units, and the kernels are essentially ignored. The arc hypothesis network consists of selected recognition network arcs applied to explain input speech segments.

As indicated previously, the full set of arc hypotheses is huge (#inputframes * #inputframes * #arcs), too hard to compute, and too hard to manipulate. Rather than computing the entire set, the method of the present invention examines or evaluates an interesting subset of arc hypotheses selected by use of ArcScore and ArcInTime.

Given an arc, A, and a time T, since A is a network arc, we also have an innode, N', and an outnode, N. There is a natural intime, ArcInTime(T,A), since this is the intime on the best path to this arc finishing at T. Finally, there is a natural score:

S=ArcScore(T,A)-NodeScore(T',N') which is the score of the best path along A which explains the input between T'+1 and T. ArcScore(T,A) is the score of the best path to A at T, NodeScore(T', N') is the score of the best path to N' at T' which, by optimization, is a subpath of the best path to A at T, and so the difference is the score for A between T' and T.

Thus, for every arc, A, and (out)time T, we have an arc hypothesis:
Label=A
InNode=(T',N')
OutNode=(T,N)
Score=ArcScore(T,A)−NodeScore(T',N').

Arc hypotheses can connect if the InNode of one is the outnode of the other. That is, they can connect if their corresponding arcs in the recognition network have a common node and if the times match.

Any path allowed by the Viterbi decoder through the recognition network can be viewed as a sequence of these arc hypotheses but most of the possible arc hypotheses generated from ArcScore and ArcInTime are not reasonable; their scores may be unreasonable or, as is usually the case, they fail to lie on a path connecting initial silence to final silence explaining the entire input. The method of the present invention employs the following procedure for generating a small subnetwork of arc hypotheses, all with reasonable scores and all lying on paths which are complete. That is, each accepted arc hypothesis will lie on at least one path from initial to final silence explaining the entire input.

The traceback procedure utilizes one more data structure which is defined as follows:

NodeOutScore(T,N) is the score of the best path in the recognition network from node N to final silence which explains the input from T+1 to the end of the utterance.

This is completely analogous to NodeScore(T,N) which does the same for initial silence to N and frames 0 to T. Note that NodeScore(T,N)+NodeOutScore(T,N) is the score of the best path through the network passing through node N at time T and explaining the entire input utterance. NodeScore could be called NodeInScore to be symmetric with NodeOutScore.

Since this is a traceback algorithm, initialization is performed by creating a final node hypothesis:
(last input frame, final silence) and the NodeOutScore for this final node is set to a minimal value, e.g. zero:
NodeOutScore(last input frame, final silence)=0 essentially reflecting the fact that there is no more input to explain at this point.

It should be noted that NodeScore(last input frame, final silence) is the score of the best path through the recognition network as a result of the essentially conventional Viterbi decoding.

The traceback algorithm proceeds as follows: Among the node hypotheses which have not yet been processed, find the one with the latest time. Initially, this will be (last input frame, final silence). It is important to process the nodes in this order so that NodeOutScore(T,N) can be properly computed from the nodes which come later in time.

As indicated previously, the method of the present invention does not attempt to evaluate all possible arc hypotheses. Rather, the method establishes a criteria or scoring threshold for accepting arc hypotheses for inclusion in building up an output structure which defines multiple possible paths through the network. Essentially, at each stage in the traceback procedure, the ArcScore of each of the arcs coming into the current node is combined with the current node's NodeOutScore and, if the sum does not exceed the score of the best path through the network by more than a preselected margin, the respective arc is included in the structure being built up. This procedure can be described in greater detail as follows:

Let the selected node hypothesis be given by (T,N) and let (T,A) be an arc hypothesis leading into (T,N) so that N is the outnode of A in the recognition network. Then, ArcScore(T,A) is the score of the best path to A at T. It follows that ArcScore(T,A)+NodeOutScore(T,N) is the score of the best legal path through the recognition network explaining the entire input utterance and finishing arc A at time T.

Let BestPathScore (=NodeScore(last input frame, final silence)) be the score of the best path through the recognition network and let BestScoreOffset be a fixed offset or margin. A percentage margin or thresholding could also be used. Then, we will accept the arc hypothesis generated from (T,A) if ArcScore(T,A)+NodeOutScore(T,N)<BestPathScore+BestScoreOffset. That is, we accept an arc hypothesis for further consideration if there is some path through the arc hypothesis network containing the arc hypothesis whose total score is within a fixed offset of the best path. Put another way, an arc hypothesis is accepted if there is a complete legal path through the recognition network containing A at T and the score is reasonable.

It may be noted that this thresholding scheme provides a uniform criterion for adding arc hypotheses in that the acceptance criterion is independent of the portion of the arc hypothesis network that is being examined.

When processing a node hypothesis, the method loops through all arc hypotheses which lead into the node hypothesis. That is, for node hypothesis (T,N) and for each arc A with outnode(A)=N, we examine ArcScore(T,A) to see if the above threshold criterion is met. If so, the arc hypothesis is added Arc Hypothesis:
Index=A
OutNode=(T,N)
InNode=(ArcInTime (T,A), InNode (A))
Score=ArcScore(T,A)−NodeScore(ArcInTime(T,A), InNode (A)).

Let T'=ArcInTime(T,A) and N'=InNode(A). If this node doesn't already exist, it is added to the list of nodes to be processed and the process sets NodeOutScore(T',N')=NodeOutScore(T,N)+Score as a first estimate of the score of the best path from (T',N') to (last input frame, final silence). Note that this sum is the cost of the best path from (T',N') along A to (T,N) plus the cost of the best path from (T,N) to the end. If this node already exists, then update the best path score to the end of the utterance is updated: by NodeOutScore(T',N')=MIN {NodeOutScore(T',N'), NodeOutScore(T,N)+Score}.

Figure 7:
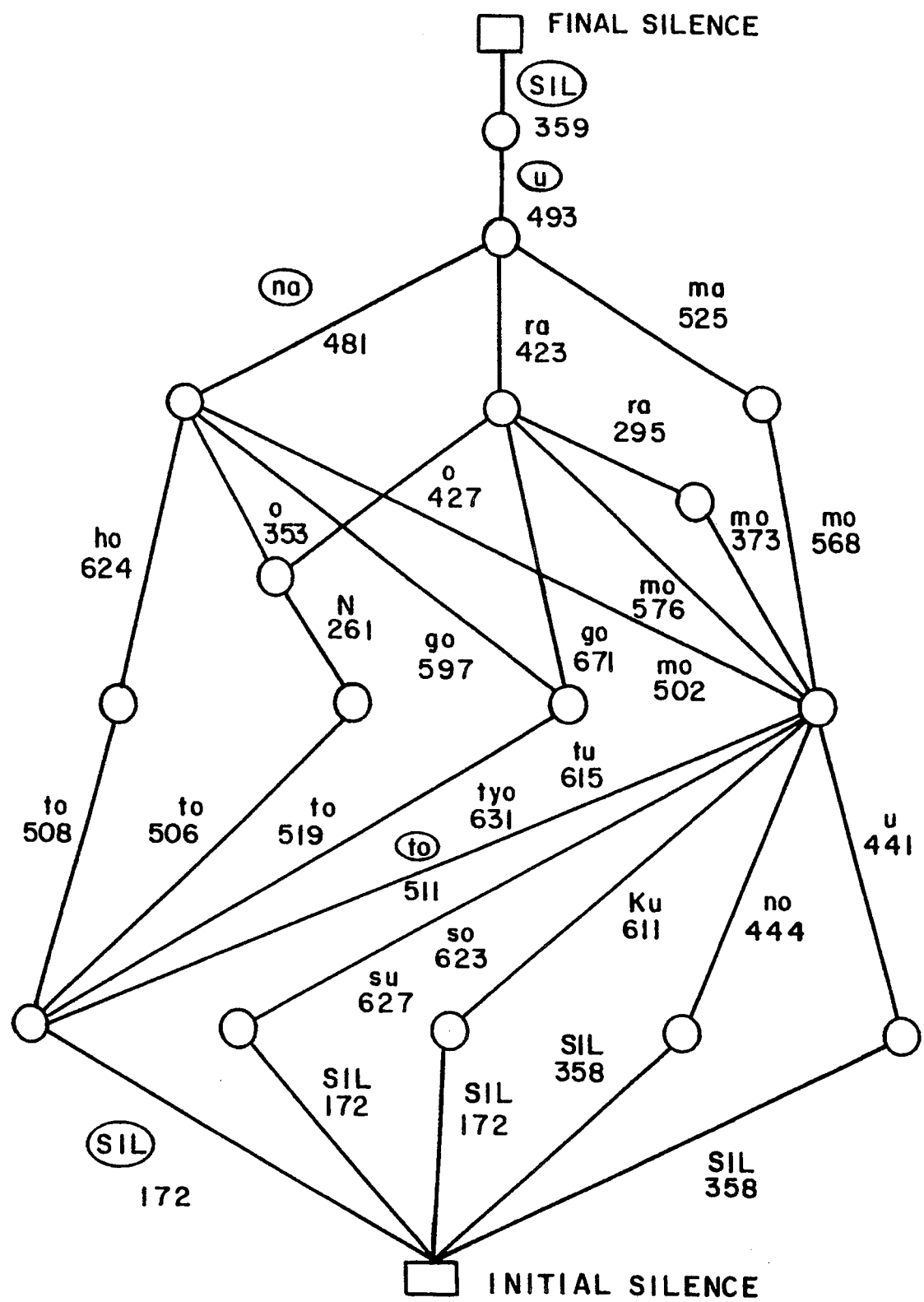
FIG. 7 is a diagram of an acoustic output network representing possible representations of an input phrase.

Because the order in which node hypotheses are processed is time-ordered, NodeOutScore(T',N') will be the least partial path score from (T',N') before this node is processed This procedure is complete when the only node remaining to be processed is (first frame, initial silence) which has no incoming arc hypotheses. Once the procedure is complete, it will be understood that a selected or limited collection of arcs and nodes will have been processed. This collection of arcs and nodes itself defines a network structure. This structure is conveniently defined as the acoustic output network (AON) and this structure defines a limited number of paths with associated scores which can then be further evaluated, for example, using contextual information to determine which of the possible phrases encompassed by the AON is the most likely candidate for correctly identifying the input speech. FIG. 7 illustrates an AON generated for a particular utterance of the phrase "tomonau" by a particular speaker, demi-mora having been combined into mora. It is useful to trace the operation of the above-described trace back algorithm to the particular utterance in generating the AON of FIG. 7.

Figure 8:
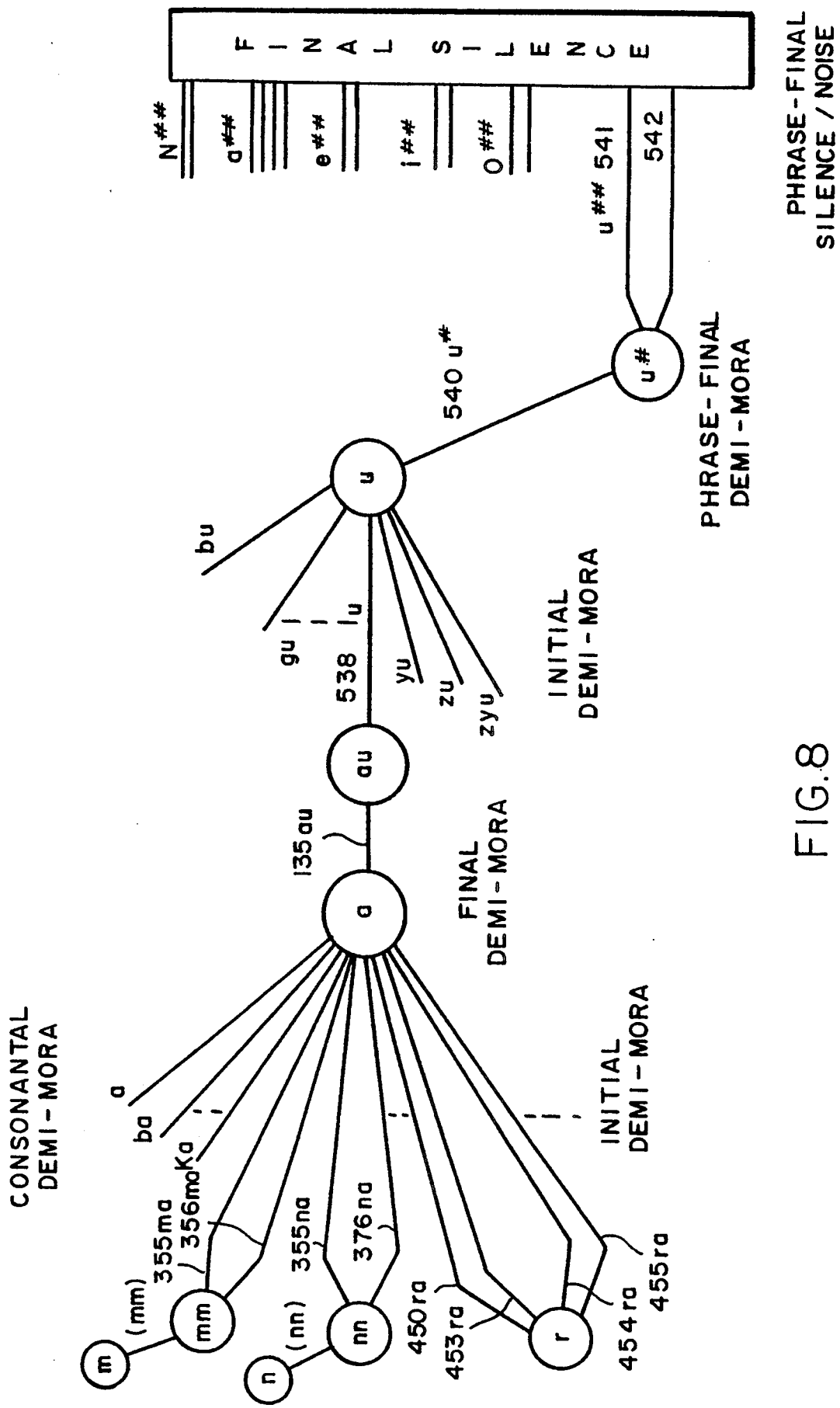
FIG. 8 represents a portion of the acoustic recognition network of FIGS. 2 and 3 encountered in developing the acoustic output network of FIG. 7.

FIG. 8 represents portions of the acoustic recognition network to which the utterance was applied. The arcs shown may be considered a limited subset of the total collection of arcs which is represented in a general way by FIGS. 2 and 3. FIGS. 7 and 8 provide the arc and node labels that are used in explaining the example.

The utterance was 78 frames long and so the method starts with a node hypothesis at (77, final silence) where NodeOutScore(77, final silence)=0.

The best path to the final node determined by the Viterbi decoded yielded NodeScore(77, final silence)=2518 which means that the best path through the network has score 2518. For this example, PathScoreOffset was set to 125 so that PathScoreThreshold = BestPathScore + PathScoreOffset =

2518 + 125 = 2643.

The following arcs lead to the final silence node and model the breath noise and silence following the various phrase-final phones of Japanese:

| For (77, final silence) | | | |
|---|---|---|---|
| ArcIndex | ArcLabel | Arcscore | ArcInTime |
| 55 | N## | 2658 | |
| 56 | N## | 2712 | |
| 94 | a## | 2788 | |
| 95 | a## | 2796 | |
| 96 | a## | 2779 | |
| 97 | a## | 2817 | |
| 159 | e## | 2776 | |
| 160 | e## | 2806 | |
| 277 | i## | 2926 | |
| 278 | i## | 2878 | |
| 412 | o## | 2695 | |
| 413 | o## | 2671 | |
| 541 | u## | 2538 | 62 |
| 542 | u## | 2518 | 59 |

Only two arcs were below threshold and both corresponded to the final silence/noise which follows /u/. It may be noted that one score is indeed the best score as it must be since one of these arcs is necessarily included in the best path.

So, we now add the two u## arcs hypotheses:

ArcHypothesis[1]:
Index u##
InNode (62, u#)
OutNode (77, final silence)
Score = ArcScore(77, 541) − NodeScore(62,u#) = 2538 − 2256 = 282

Create a new node hypothesis at (62, u#) with NodeOutScore(62, u#)=282. Note that ArcScore(77, 541) is the score of the best path through the recognition network which finishes on arc 541 (u##) and that NodeScore(62, u#) is the score for the portion of this path leading up to arc 541 so the difference is the score of the portion of the path covered by arc 541. Also note that NodeOutScore(62, u#) is the cost of getting from node hypothesis (62, u#) to the end of the utterance and is just the cost of the last arc. In general, NodeOutScore is the sum of the scores of the arc hypotheses on the best path leading to (last input frame, final silence) for a given time and node.

ArcHypothesis[2]:
Index u##
InNode (59, u#)
OutNode (77, final silence)
Score=2518−NodeScore(59, u#)=2518−2159=359.

Create a new node hypothesis at (59, u#) with NodeOutScore(59, u#)=359.

Figure 9:
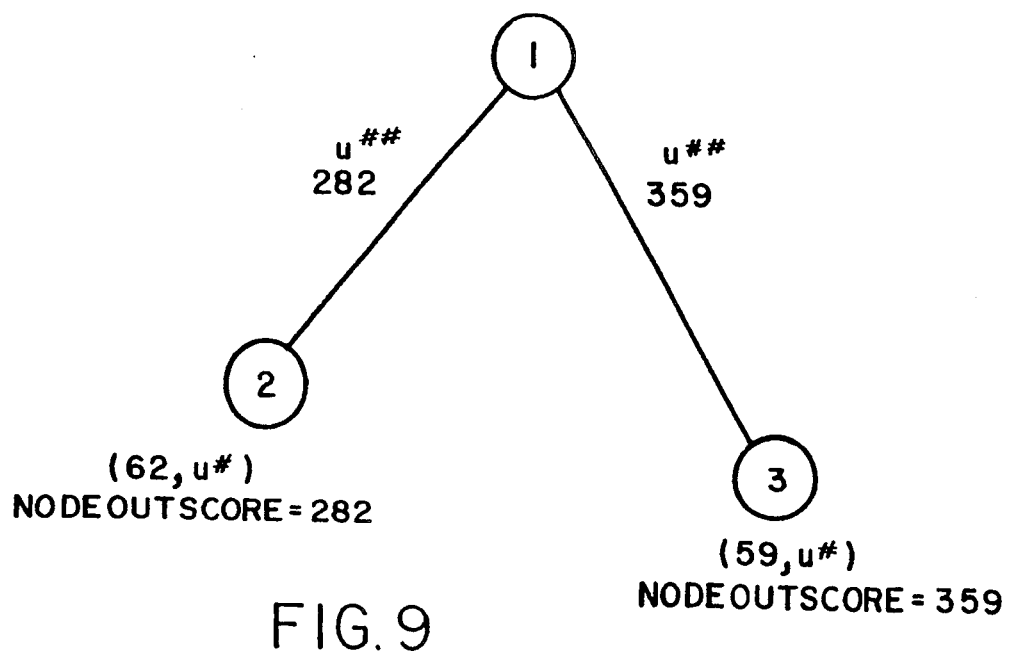
FIGS. 9–13 illustrate successive steps in tracing back through the network to develop the alternate paths of FIG. 7.

This procedure is depicted in FIG. 9.

There is only one arc leading to node u#(for this example), arc u# which represents the trailing vocalic portion of the vowel /u/ in phrase final position when tracing back along arc u# from node hypothesis times 62 and 59. We have:

ArcScore(62, u#)=2256 ArcInTime(62, u#)=54
ArcScore(62, u#)+NodeOutScore(62, u#)=2256+282=2538
<2643=PathScoreThreshold
ArcScore(59, u#)=2159 ArcInTime(59, u#)=54.
ArcScore(59, u#)+NodeOutScore(59, u#)=2159+359=2518
<PathScoreThreshold so that both possible arcs will be accepted. This was forced since the local best paths had scores below threshold.

ArcHypothesis[3]:
Index u#
InNode (54, u)
OutNode (62, u#)
Score=2256−NodeScore(54, u)=2256−1916=340 and a new node hypothesis was created at (54, u) with NodeOutScore(54, u)=NodeOutScore(62, u#)+Score=282+340=622. Note that NodeOutScore is the cost of the two arc hypotheses (62, u#) and (77, u##) leading to the end of the arc hypothesis network.

ArcHypothesis[4]:
Index u#
InNode (54, u)
OutNode (59, u#)
Score=2159−NodeScore(54, u)=2159−1916=243.

However, we already have a node at (54, u). Since NodeOutScore(62, u#)+Score=243+359=602 is smaller than the 622 computed above, NodeOutScore(54, u)=602.

Note that we have two paths from (54, u) to the final node which correspond to the same arc sequences (u#-u##). This is redundant and the poorer scoring path can be removed.

Figure 10:
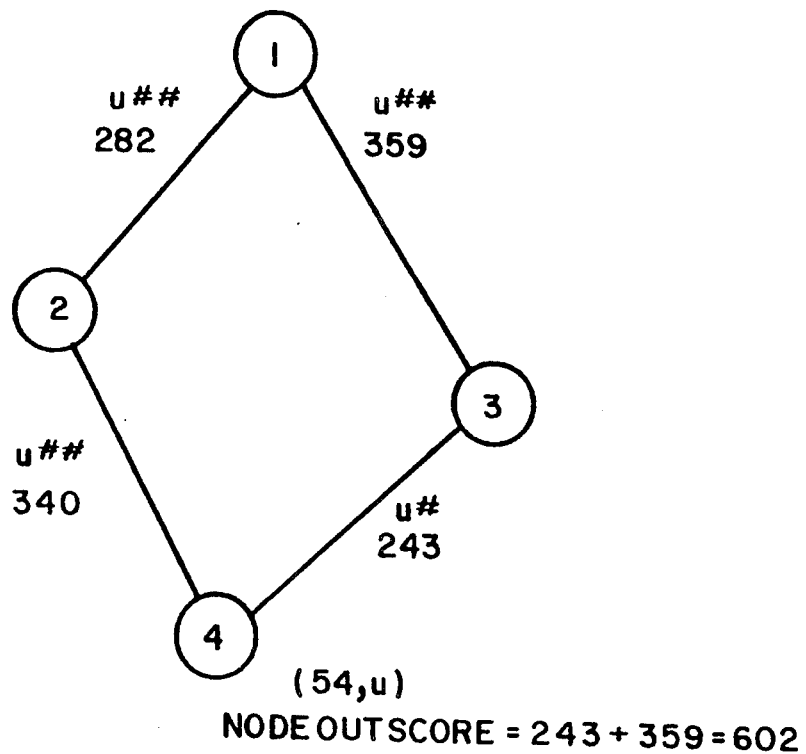

This stage of node processing is depicted in FIG. 10.

There are many arcs which enter the (54, u) node. However, all but one will be disqualified by the threshold PathScoreThreshold−NodeOutScore(54, u)=2643−602=2041:

| ArcLabel | ArcScore | ArcInTime |
|---|---|---|
| bu | 2246 | |
| du | 2409 | |
| gu | 2165 | |

-continued

| ArcLabel | ArcScore | ArcInTime |
|---|---|---|
| gu | 2137 | |
| hu | 2358 | |
| hu | 2409 | |
| hu | 2190 | |
| hu | 2389 | |
| ku | 2496 | |
| ku | 2742 | |
| mu | 2118 | |
| nu | 2203 | |
| nu | 2188 | |
| nu | 2332 | |
| ru | 2355 | |
| ru | 2320 | |
| ru | 2144 | |
| ru | 2326 | |
| ru | 2280 | |
| ru | 2268 | |
| ru | 2287 | |
| ru | 2167 | |
| ryu | 2402 | |
| ryu | 2361 | |
| su | 2611 | |
| syu | 2798 | |
| tu | 2719 | |
| tu | 2593 | |
| tyu | 2907 | |
| u | 3184 | |
| u | 3787 | |
| u | 2056 | |
| u | 1916 | 48 |
| u | 2285 | |
| yu | 2545 | |
| yu | 2365 | |
| zu | 2528 | |
| zyu | 2586 | |
| zyu | 2654 | |

Figure 11:
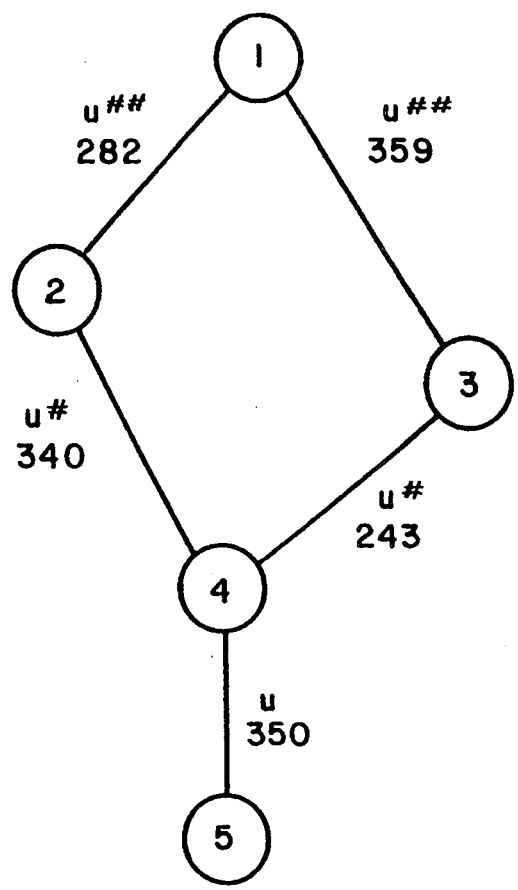

Thus we will create a new arc hypothesis:
ArcHypothesis[5]:
Index u
InNode (48, au)
OutNode (54, u)
Score = 1916 − NodeScore(48, au) = 1916 − 1666 = 350
and a new node hypothesis is created at (48, au) with NodeOutScore(48, au) = 602 + 350 = 952. Note that this arc corresponds to the initial portion of the mora /u/ when it is preceded by the vowel /a/. This stage is depicted in FIG. 11.

Figure 12:
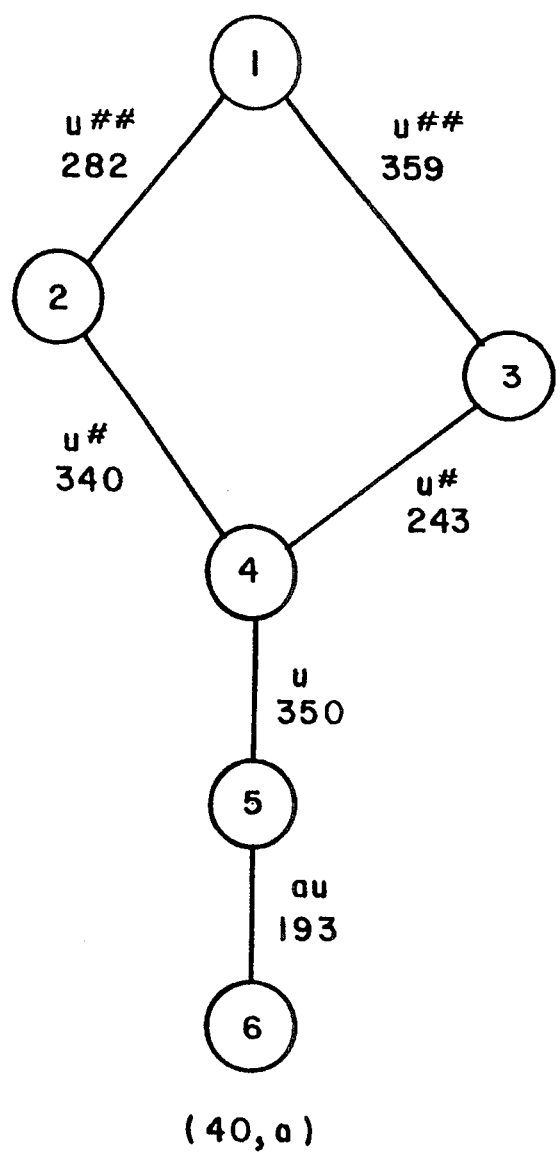

Again, there is only one arc into the (48, au) node with ArcScore = 1666 and ArcInTime = 40. ArcScore + NodeScoreOffset = 1666 + 952 = 2518 so this is along the best path and is, of course, below threshold (2643). So we add a new arc hypothesis:

ArcHypothesis[6]:
Index au
InNode (40, a)
OutNode (48, au)
Score = 1666 − NodeScore(40, a) = 1666 − 1473 = 193
with a new node hypothesis at (40, a) with NodeOutScore(40, a) = 952 + 193 = 1145. This arc corresponds to a final demi-mora for the vowel /a/ when it is followed by the mora /u/. This stage is depicted in FIG. 12.

There are many incoming arcs to the (40, a) node many of which fall below the threshold PathScoreThreshold NodeOutScore − NodeOutScore(40, a) = 2643 − 1145 = 1598. The incoming arc with arc scores at time 40 above threshold are given below:

| Arcs Above Threshold: | |
|---|---|
| Label | ArcScore(40, *) |
| a | 2310, 2228, 2335, 1981, 1928, 1729, 1693 |
| ba | 1689, 1647 |
| da | 1736 |
| ga | 1688, 1676, 1678, 1671, 1699, 1668, 1687, 1692, 1710, 1727, 1697, 1695, 1655 |
| ha | 1791, 1797, 1755, 1817, 1895, 1807 |
| ka | 1894 |
| ma | 1599 |
| pa | 2093 |
| ra | 1730, 1630, 1618 |
| sa | 2109 |
| ta | 1797, 1785 |
| wa | 1753, 1738 |
| ya | 1723, 1978, 1855 |
| za | 2063, 1901, 1838, 1777 |

| Arcs Below Threshold: | | |
|---|---|---|
| Label | ArcScore(40, *) | ArcInTime |
| ma | 1583 | 36 |
| na | 1589 | 36 |
| na | 1473 | 36 |
| ra | 1489 | 34 |
| ra | 1555 | 34 |
| ra | 1550 | 34 |
| ra | 1588 | 34 |
| ra | 1498 | 38 |

Figure 13:
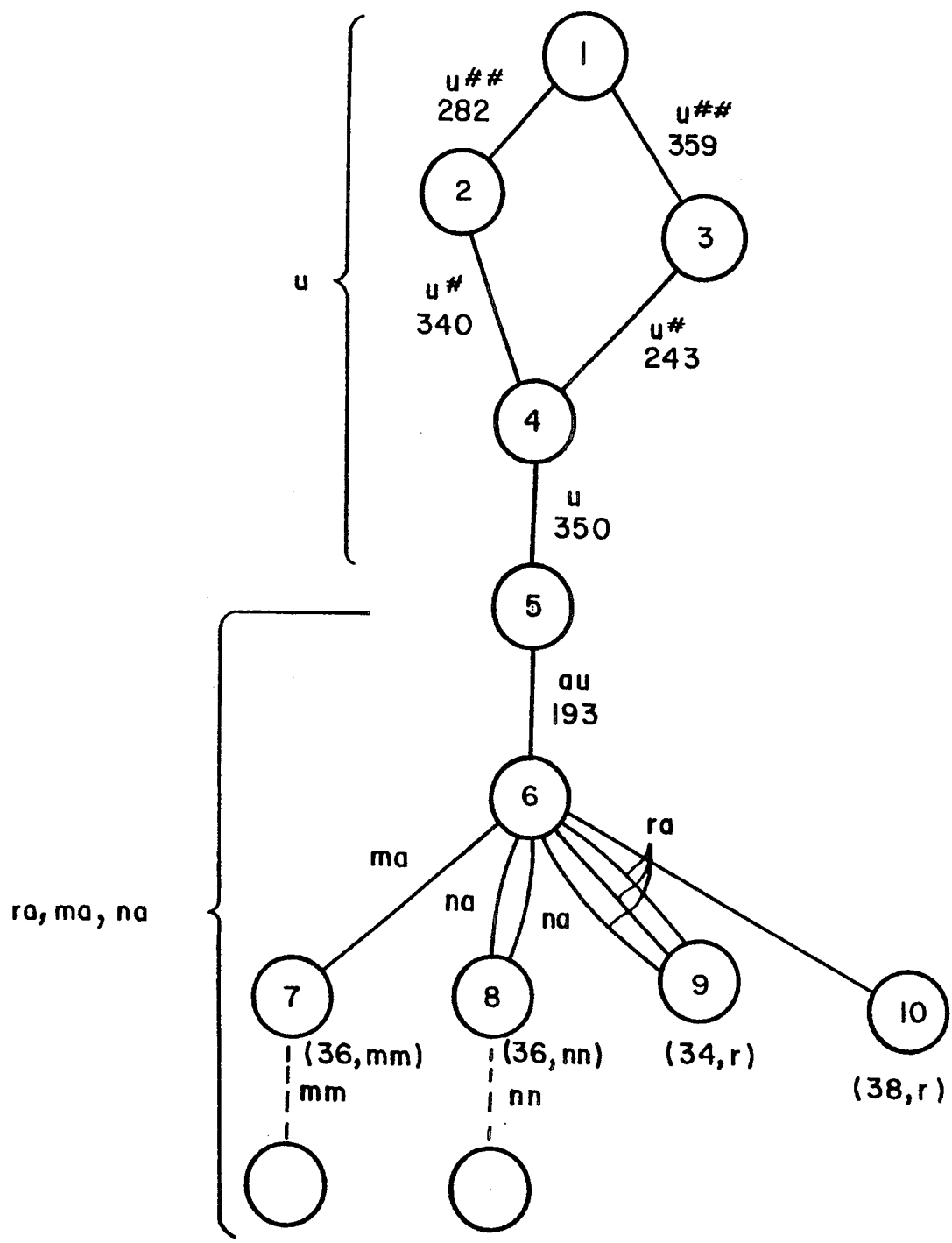

New arc hypotheses are created for all these arcs and new node hypotheses are created at (36, mm), (36, nn), (34, r), and (38, r). This stage is depicted in FIG. 13.

The process of adding arc and node hypotheses to the structure being built up is continued until the only node left to be processed is (initial frame, initial silence). At that point, a structure has been built up which comprises only a limited set of the total number of possible arcs and all possible paths through the structure will have scores which are at least reasonable. Accordingly, alignment of the structure with the mora structures of words in the system's vocabulary will be greatly facilitated as will the use of contextual information to choose from between various candidate words or phrases. As the network is made up of arcs which correspond to so-called demi-mora, it may also be useful to first combine demi-mora into mora, respecting the constraints of the language.

The microfiche appendix identified previously is a listing of a computer program written in the "C" computer language which performs the algorithm of the present invention. The listing comprises several sections which perform the following function.

| | |
|---|---|
| RunNet | This is the calling routine or top level of code |
| DM_Recognition | Performs Viterbi decoding |
| ARC_BuildAON | Builds the acoustic output network, i.e. the basic output structure |
| ARC_ProcessBuildNode | Builds the network nodes (used by other code sections) |
| ReduceAON | Reduces output structure by combining redundant paths, etc. |

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a speech recognition system of the type in which, in response to an input utterance characterized by a sequence of input acoustic segments, a path is dynamically decoded through a recognition network of sound characterizing arcs, predetermined ones of which connect at nodes which define permissible transitions, by matching sequential input acoustic segments to corresponding points along each possible arc and by measuring closeness of match to obtain a cost metric for reaching each node by the best path for each input time;

a computer implemented method of generating an output network structure which is composed of a selection of said arcs explaining segments of the input utterance and interconnections thereof, said method comprising:

for each arc, calculating and storing along with said node cost metrics, an arc score which represents the best path cost of reaching the last point on that arc at the corresponding time;

when the end of the recognition network is reached, initiating a traceback procedure which comprises:

assigning a minimal node out score to the end of the recognition network;

for each successive node in said traceback procedure, selecting all incoming arcs having arc scores which, when combined with the node out score of the respective terminating node, do not exceed the best path score for the end of the recognition network by more than a preselected margin; and calculating, for each node which initiated selected arcs, a node out score which represents the cost of the best path from that node to the end of the recognition network, whereby the successively selected arcs and the joining nodes define the output network structure.

2. The method as set forth in claim 1 wherein each arc comprises a succession of spectral states.

3. The method as set forth in claim 2 wherein an input utterance is converted to a succession of spectral frames and said frames are matched to said states with said cost metric being a function of the closeness of match.

4. The method as set forth in claim 3 wherein said margin is a fixed offset in the cost metric.

5. In a speech recognition system of the type in which, in response to an input utterance characterized by a sequence of input acoustic segments, a path is dynamically decoded through a recognition network of sound characterizing arcs each of which comprises a succession of preselected spectral states, predetermined ones of said arcs being connected at nodes which define permissible transitions, by matching the spectral characteristics of sequential input acoustic segments to corresponding spectral states along each possible arc and by measuring closeness of match to obtain a cost metric for reaching each node by the best patch for each input time;

a computer implemented method of generating an output network structure which is composed of a selection of said arcs and interconnections thereof together with corresponding costs, said method comprising:

for each arc, calculating and storing along with said node cost metrics, an arc score which represents the best path cost of reaching the last point on that arc at the corresponding time and an arc intime which represents, for the best path, the time of leaving the previous arc;

when the end of the recognition network is reached, initiating a traceback procedure which comprises:

assigning a minimal node out score to the end of the recognition network;

for each successive node encountered in said traceback procedure, selecting all incoming arcs having arc scores which, when combined with the node out score of the respective terminating node, do not exceed the best path score for the end of the recognition network by more than a preselected margin; and calculating, for each node which initiates selected arcs as identified by the respective arc intime, a node out score which represents the cost of the best path from that node to the end of the recognition network, whereby the successively selected arcs and the joining nodes define the output structure.

* * * * *